United States Patent [19]

Jinzenji et al.

[11] Patent Number: 6,032,189
[45] Date of Patent: Feb. 29, 2000

[54] NETWORK DATA DISTRIBUTION SYSTEM

[75] Inventors: Hiroshi Jinzenji, Yokosuka; Tatsuaki Ito; Tetsuo Tajiri, both of Yokohama, all of Japan

[73] Assignee: Nippon Telegraph and Telephone Corp., Tokyo, Japan

[21] Appl. No.: 08/795,937

[22] Filed: Feb. 5, 1997

[30] Foreign Application Priority Data

Feb. 6, 1996 [JP] Japan .................................. 8-019580
Oct. 9, 1996 [JP] Japan .................................. 8-268252

[51] Int. Cl.$^7$ ..................................................... G06F 15/16
[52] U.S. Cl. .......................... 709/235; 709/237; 709/200; 709/226; 370/230
[58] Field of Search .......................... 395/200.31, 200.33, 395/200.64, 200.65, 200.6; 370/230; 709/201, 203, 235, 230, 234

[56] References Cited

U.S. PATENT DOCUMENTS

| 5,193,151 | 3/1993 | Jain | 395/200.67 |
|---|---|---|---|
| 5,495,426 | 2/1996 | Waclawsky et al. | 395/200.56 |
| 5,537,446 | 11/1993 | Lakshman | 375/371 |
| 5,548,533 | 8/1996 | Gao et al. | 395/200.65 |
| 5,663,951 | 9/1997 | Danneels et al. | 370/230 |
| 5,668,951 | 9/1997 | Jain et al. | 395/200.65 |
| 5,734,833 | 3/1998 | Chiu et al. | 395/200.55 |
| 5,751,969 | 5/1998 | Kapoor | 395/200.02 |
| 5,758,085 | 5/1998 | Kouoheris et al. | 395/200.61 |

FOREIGN PATENT DOCUMENTS 5-327769  12/1993  Japan .

OTHER PUBLICATIONS

H. Jinzenji et al., "Software Vision: A Scalable Video Distribution Technique for the Internet," ITE: Institute of Television Engineers of Japan, Annual Conv. ITE, 24–2, pp. 356–357, 1996.
H. Jinzenji et al., "Real–time Stream Transport Protocol and Software Vision", Proceedings of IPSJ Symposium, vol. 96, No. 2, pp. 9–14, 1996.
H. Jinzenji et al., "A Scalable Video Distribution Technique for the Internet", IEEE Global Internet 1996 London: Work in Progress, pp. 1–6, Nov. 11, 1996.
Jha, et al. Continuous Media Playback and Jitter Control, IEEE Multimedia 1996, pp. 245–246, Jun. 1996.

Primary Examiner—Glenton B. Burgess
Assistant Examiner—William Titcomb
Attorney, Agent, or Firm—Finnegan, Henderson, Farabow, Garrett & Dunner, L.L.P.

[57] ABSTRACT

A network data distribution system which is operated, under circumstances affected by external or internal factors, without discontinuing a data distribution service while being adapted to the present situation is provided. In the server side of the system, data requested from a client are divided into packets, and packet data is formed by adding a time index, and in the client side, an amount of transmission or processing delay is calculated based on the time index included in the received packet data, and delay time information based on the calculated result is communicated. The server side selects the packet data to be next transmitted based on the communicated delay time information, and sends the selected packet data. That is, the client has the initiative of controlling the delay situation; thus, it is possible to perform adaptive operations according to delay situations occurring at each side of the server, the network, and the clients which are independently managed, and to realize the best data regeneration performed in the existing system capability.

53 Claims, 7 Drawing Sheets

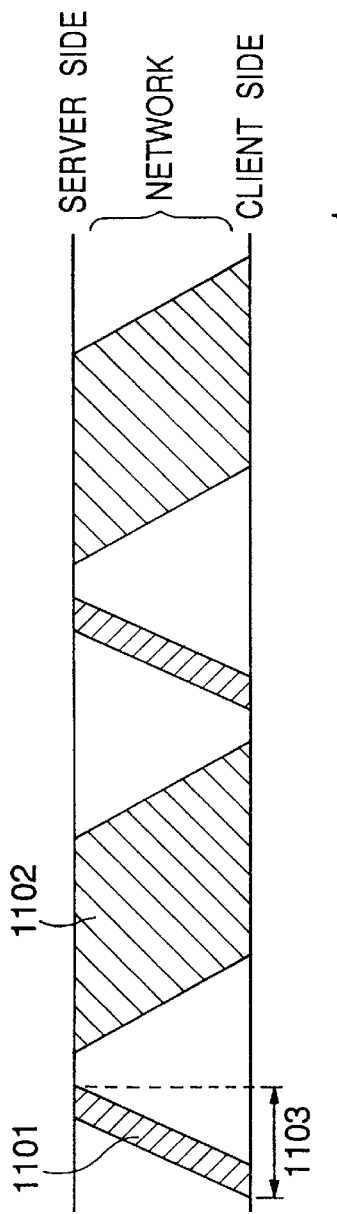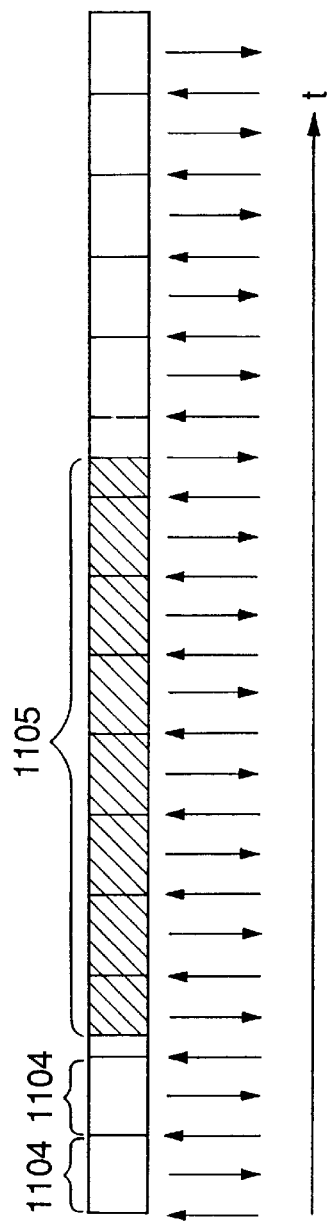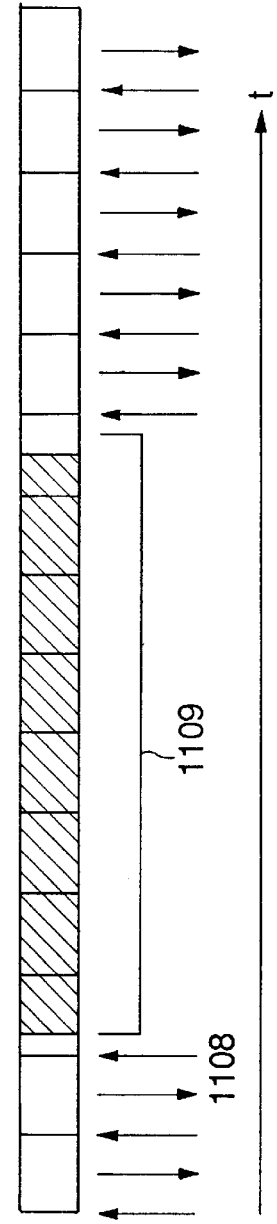

NETWORK DATA DISTRIBUTION SYSTEM

BACKGROUND OF THE INVENTION

1. Field of the Invention

The present invention relates to a network data distribution system in which high-quality data (especially, video data) distribution is realized and capability of data transmission between a server and clients is improved in a system consisting of a server (or servers), clients, and a network, which are separately managed. This application is based on patent applications Nos. Hei8-019580 and Hei8-268252 filed in Japan, the contents of which are incorporated herein by reference.

2. Description of the Related Art

According to the spread of local area networks (abbreviated to a "LAN", hereinbelow), improvements in the properties of calculators, and development of mass storage and low priced disk devices, database systems of server-client form have recently also increased. In such a database system, a database is constructed in the server side, while a client requests information from the server when necessary. According to the request issued, data transmission and receipt are performed between the server and the client. When the client receives data which were transmitted from the server, the client decodes the data for proper use.

Recently, database systems have to handle data of not only text-form information, but also audio or video information. In particular, video data have larger data sizes than that of other media, even if the video data have been preprocessed and stored by using a compressive encoding method; thus, it is not practical to adopt, for example, a file transfer method in which all data are once transmitted to a client and then any data are read out. Therefore, another method has been generally adopted, in which data necessary for a client to perform real-time data decoding and regeneration are continuously supplied from the server. In this method, the server side controls the rate of supplying data, while the client has only to receive and regenerate the data.

However, in order to provide a stable video distribution service by using a conventional database system performing video distribution, it is necessary to establish a system construction including a high-quality server for assuring plural clients of stable data-supply; a network having a secured transmission band in which data transmission is not affected by other traffic; and clients having uniform properties for regenerating all the supplied data. These requirements are based on the premise that the data transmission is performed in an ideal system circumstance without consideration of other external factors. However, also from a point of efficiency or economical view, it is desired to realize a video distribution system under existing circumstances.

Here, the "existing circumstance" is defined for each of the server, the network, and the clients, individually. As to the server, a general computer connected to an existing network is assumed, and such a general computer can also be used for a use other than for the video distribution. As to the network, it can also be used for another use other than for the video distribution, and in the network, a band necessary for video data transfer is not always ensured. In addition, another situation is also assumed, in which under a circumstance in which plural networks are connected to each other, data transmission from a server to an client is performed via plural networks. As to the clients, existing computers such as PCs (personal computers) or WSs (work stations) are assumed, which may have an exclusive hardware for decoding encoded video data, or which may be operated based on software. Regarding the software-base, the client may easily suffer an effect such that the condition of resources (the CPU, memories, and the like) may sometimes changed in accordance with internal or external processing situations.

On the other hand, it is not necessary that the server and the client be in a one-to-one correspondence during data transmission, and various systems which can supply data for plural clients at once have been realized. FIG. 8 shows an example of the server-clients data transmission system, which includes a server 101 for providing data by using transmitter 121, and four clients 111, 112, 113, and 114, connected to the server via network 3, for receiving data by using receivers 131, 132, 133, and 134. Such a data transmission system can be applied to the above video distribution service.

Furthermore, another type of transmission system having plural servers, that is, a system in which the number of servers is not limited to one, has been realized. In such a system, the data which are the same as those provided by a server are duplicated to other servers. In this system, a client can obtain the same data by accessing any server in the system.

However, the above-described server-clients data transmission system has some problems to be solved.

The first problem is lowering of the data-transmitting capability of a server due to overload of the server, that is, excess of access by the clients. If simultaneous data supply operations for plural clients are permitted, the load borne by the server increases according to the increase of the number of clients which access the server. If the load borne by the server exceeds an allowable amount decided for normal data supply, data supply from the server to the clients may be delayed, or may further be stopped. That is, the lowering of capability (or throughput) of the server due to the overload disturbs normal data supply.

The second problem relates to a conventional transmission system comprising plural servers which have the same data (i.e., mirror servers). This conventional system has an effect of dispersing the load. However, it is necessary to maintain the situation that all the servers have the same data; thus, whenever the data to be provided are changed, the data must be duplicated to all the servers. This is the second problem.

The third problem relates to a case in which permission of access by clients to the server is limited. When the access to the server is limited to protect system-security, a client which is not permitted to access the server cannot acquire data.

SUMMARY OF THE INVENTION

The present invention has been made in consideration of the above-explained circumstances, and it is an object of the present invention to realize a network data distribution system which is operated, under circumstances affected by external or internal factors, without discontinuing a data distribution service while being adapted to the present situation. In addition, it is also an object of the present invention to realize a network data distribution system having an improved server-client data transmission capability.

Therefore, the present invention provides a network data distribution system for distributing encoded data from a server side to clients via a network, comprising:

(1) in the server side, packet data forming means for dividing data requested from a client into packets, and forming packet data by adding a time index relating to a process used for processing each divided packet to the packet; sending means for sending the packet data to the client which requested the data; and (2) in the client side, request means for requesting desired data from the server; receiving means for receiving the packet data sent from the server; transmission delay calculating means for calculating an amount of transmission delay based on the time index included in the packet data received by the receiving means; process delay calculating means for calculating an amount of process delay relating to decoding of the received packet data, based on the time index included in the packet data received by the receiving means; delay information communicating means for communicating delay time information based on the calculated amount of transmission or process delay to the server, and (3) wherein the sending means in the server side selects the packet data to be next transmitted based on the delay time information communicated by the delay information communicating means, and sends the selected packet data.

According to the system, when data are distributed via a network, it is possible to perform adaptive operations according to delay situations occurring at each side of the server, the network, and the clients which are independently managed, and to realize the best data regeneration performed in the existing system capability. In most existing systems, the data transfer rate is controlled by the server side; however, in the present system, the client has the initiative of controlling the transfer rate and of detecting the (delay) situations. That is, the client side centrally detects (i) the situations of the server and network sides by monitoring the arrival status of data; and (ii) the situation of the client-side by monitoring the progress of the decoding. Therefore, the load of the server side can be lowered; the upper limit of the number of the clients which can simultaneously access the server can be increased; and it is also possible to suppress the transmission of useless packets on the network. The present system is particularly effective when the client side performs the encoding using software, or when a transmission band necessary for distributing video data is not ensured on the network.

On the other hand, if the encoded data have a form such that data which can be independently decoded are periodically included in data which can be decoded by using a correlation with other data, it may be effective to use a variation in which the delay information communicating means in the client side sends refreshed-data request information for requesting the data which can be independently decoded, as well as the delay time information, and when the server side receives the refreshed-data request information, the sending means selects and sends the packet data to be transmitted next which includes such data which can be independently decoded, based on the delay time information. According to this variation, data which can be independently decoded can be periodically included in the transmitted data.

In addition, it is also possible to provide, in the client side, decoding control means for controlling a decoding process in a manner such that the decoding process for the packet data which were received and have not yet been decoded is suspended when the sending means in the server side selectively sends the packet data based on the delay time information, and the decoding process is restarted with the packet data which the sending means newly selects and sends.

According to such means, it is possible to eliminate disturbance in the decoded data and to realize rapid system response.

Furthermore, if the transmission band of the network is narrow or transmission delay is large, the following variation may be taken, such that the request means in the client side requests the server to send a plurality of the packet data together, and the sending means in the server side sends the plural packet data continuously to the client side when transmission of a group of the plural packet data is requested by the request means. This variation is desirable for solving process delay.

As described above, by detecting the situation of each system constituent, and performing adaptive operations according to the detected situations, a desirable data distribution service can be realized in a system consisting of a server, a network, and clients which are independently managed, such system being mainly used at present.

It is also possible to locate single or multi-stage relay servers, each relay server having a receiver for receiving data and a transmitter for transmitting the received data, in a part of or the whole of plural paths concatenating the server and the clients via the network. The transmitter may transmit data to plural destinations in parallel.

Accordingly, the distribution function is improved and decentralized; thus, when the data transmitting capability of the server for distributing data is insufficient, or when a relay server having insufficient capability of relaying data is included, data can be distributed to the clients by suitably constituting the paths in the system. Additionally, it is possible to increase the number of the clients which can simultaneously use the service.

It is also possible to further provide server load monitoring means for monitoring the load status of the server which distributes data; and path-reconstructing means for changing the form of the path-connection between the server which distributes data, the relay servers, and the clients, based on the load status monitored by the server load monitoring means. Similarly, regarding the relay servers, it is also possible to further provide relay-server load monitoring means for monitoring a load status of each relay server; and path-reconstructing means for changing the form of the path-connection between the server which distributes data, the relay servers, and the clients, based on the load status monitored by the relay-server load monitoring means.

According to such an arrangement, the load status of each server can be detected by each load monitoring means, and it is possible to change the path-connection form of the system in a manner such that some clients or relay servers are connected, not to a relay server with a heavy load, but to a relay server with a lesser load, by using the path-reconstructing means. Therefore, the average loads of the server for distributing data and the relay servers are always kept low; thus, the quality of the overall service is made uniform.

Additionally, each relay server does not possess data, but relays data. Therefore, when the data to be provided for the clients are changed, only the one master server for distributing data needs to change data; thus, operations after the data change are easily performed.

Furthermore, the relay servers may include a relay server which has permission to access both the server which distributes data and a client which has no permission to access the server which distributes data. In this case, it is possible to provide data to a client which has no permission to access the server which distributes data.

The present invention also provides apparatuses and methods (having the above-described features) relating to both the server and the client sides, the constituents of the above network data distribution system, and the present invention further provides storage media storing computer programs for making a computer execute the methods.

BRIEF DESCRIPTION OF THE DRAWINGS

FIG. 5A is a diagram for explaining the concept for the transmission operation for a case in which one packet data is transferred for one request packet; FIG. 5B is a diagram for explaining the concept for the transmission operation for a case in which request packets and packet data are transmitted by turns; and FIG. 5C is a diagram for explaining the concept for the transmission operation for a case in which plural packet data are transmitted together after one request packet.

DESCRIPTION OF THE PREFERRED EMBODIMENTS

Hereinbelow, preferred embodiments of the present invention will be explained in detail with reference to the drawings.

First Embodiment

Figure 1:
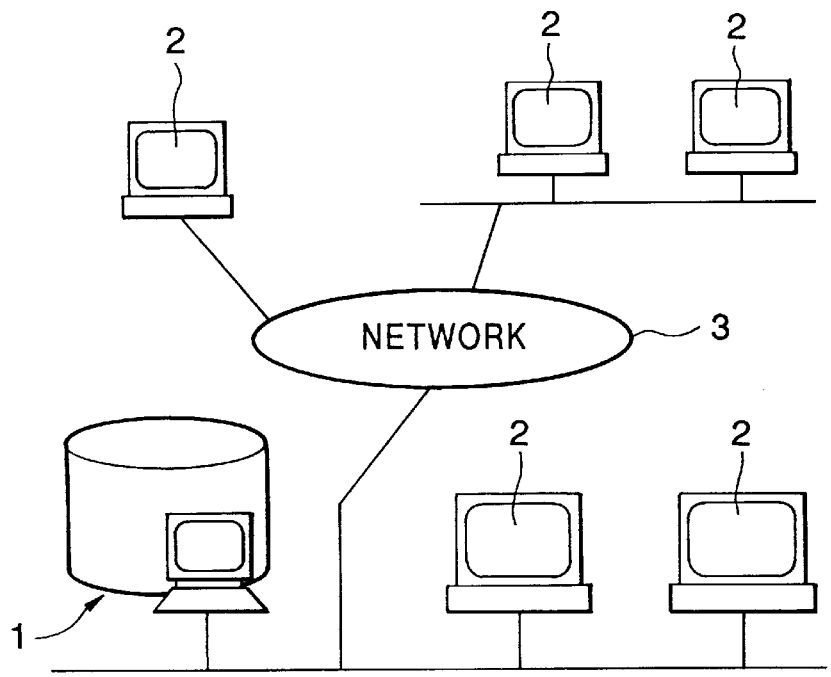
FIG. 1 is a diagram for explaining the system construction of the first embodiment according to the present invention.

FIG. 1 is a diagram for explaining the system construction of the first embodiment according to the present invention. In this embodiment, a system example using the H.261 coding method, which is used in, for example, ISDN visual telephones, will be shown. This system is realized on network 3 (as shown in FIG. 1) such as the Internet which is constructed as a set of plural LANs, and by server 1 and plural clients 2. Server 1 and clients 2 are connected with each other via network 3 to which the server and the clients are connected, respectively.

Figure 2A:
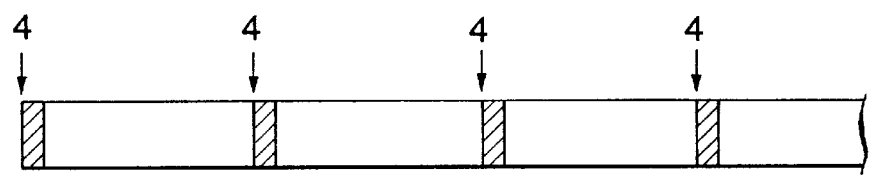
FIGS. 2A–2C show the format for transmitting packet data in the first embodiment.
Figure 2B:
Figure 2C:
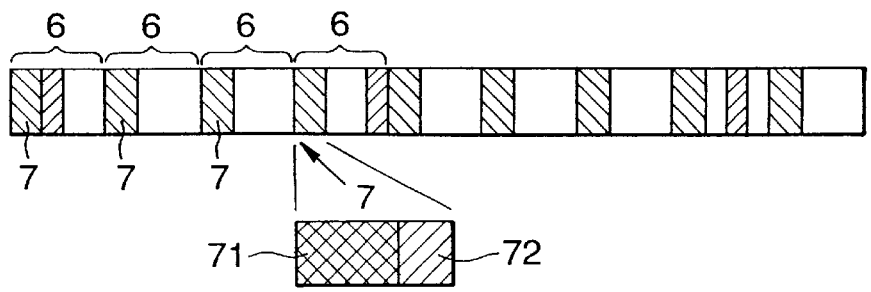

FIGS. 2A–2C show the format for transmitting data in the present embodiment. The H.261 method uses the so-called "Inter-Frame Predictive Coding" method. As to video (i.e., moving picture) data to be distributed to clients 2, an image frame which is encoded by using the so-called "Intra-Frame Coding" mode is periodically inserted, as shown in FIG. 2A. This insertion is performed by an encoder which receives an instruction in the encoding operation.

Hereinafter, an image frame which is encoded by using the Intra-Frame Coding mode will be called "refreshed data". The hatched parts in FIG. 2A indicate refreshed data which were periodically inserted into video data, and arrows 4 indicate the head of each refreshed data. The encoded data according to the H.261 scheme are represented as a bit stream. Therefore, in order to make the data-transfer process on network 3 easy, a bit stream of data is divided into packets 5 as shown in FIG. 2B, the size of each packet being suitable for the data transfer on the network; header 7 is added to each packet 5 so as to make packet data 6; and a set of packet data 6 is stored in server 1 as individual video data. In addition, in the following, each "packet data" may be simply called a "packet" for the convenience of explanation.

In the case of a storage-type service, a set of packet data 6 are stored as files, while in the case of a real-time distribution service, a set of packet data 6, which belongs to a predetermined period from the most recent to the oldest, are always stored in the server. That is, server 1 treats video data in which data which have high priority and which can be independently decoded are periodically located, irrespective of whether data are previously stored or data are treated in real-time.

The header 7 of each packet data includes (i) time index 71 which is indicated by an (expected) starting time of the decoding process for the bit stream included in the packet under a situation that the decoding of the former bit streams have been normally performed without any undesirable effects such as delay, and (ii) identifier 72 which indicates whether data encoded by the Intra-Frame Coding is included in the packet.

Figure 3:
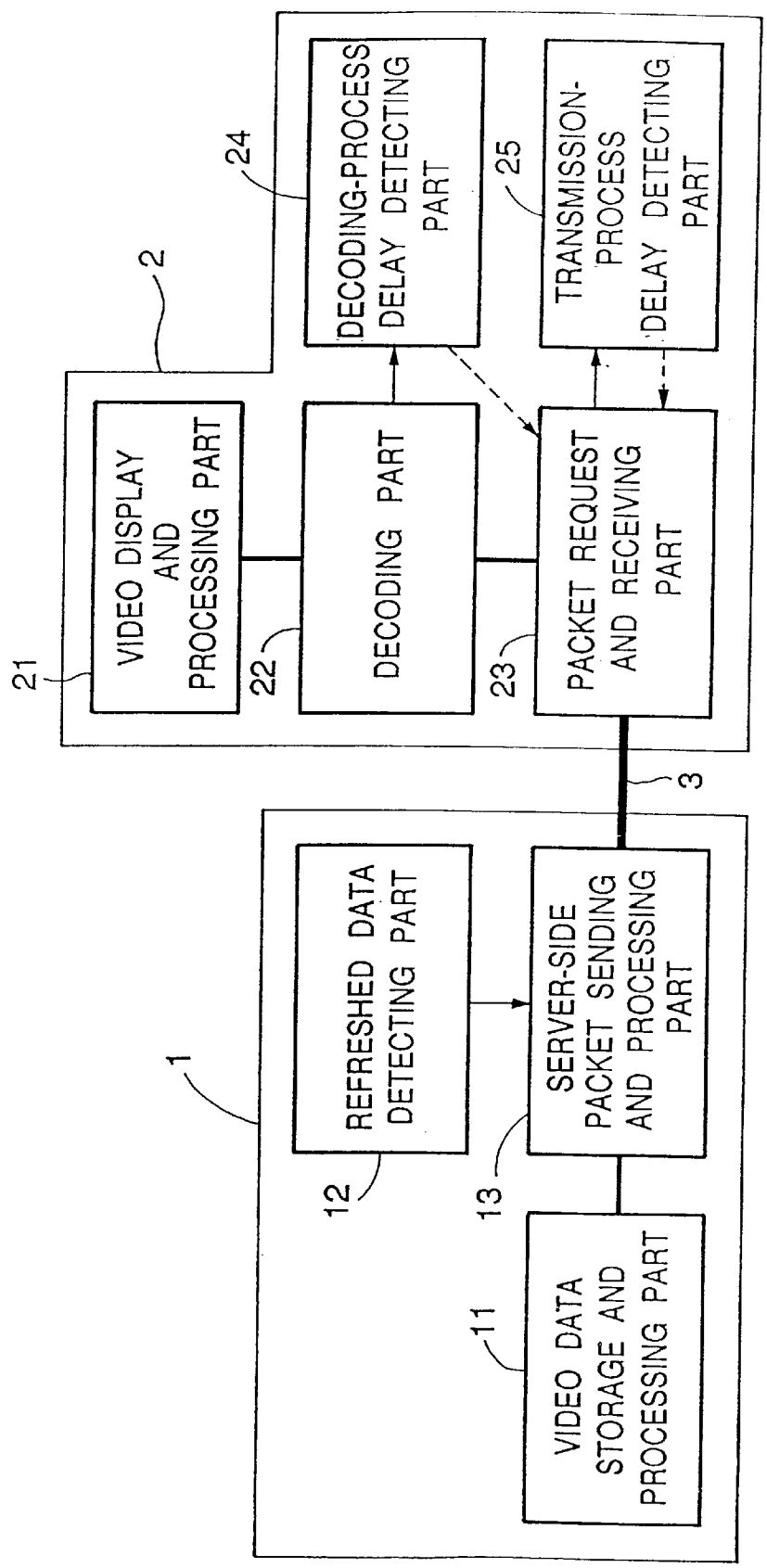
FIG. 3 is a block diagram showing the construction of the server and the client in the first embodiment.

FIG. 3 is a block diagram showing the construction of the server and the client in the present embodiment. The server 1 side comprises video data storage and processing part 11, refreshed data detecting part 12, and server-side packet sending and processing part 13. On the other hand, the client 2 side comprises video display and processing part 21, decoding part 22, packet request and receiving part 23, decoding-process delay detecting part 24, and transmission-process delay decoding part 25. Here, server-side packet sending and processing part 13 in the server 1 side and packet request and receiving part 23 in the client 2 side are connected to network 3.

The operation of the present embodiment will be explained based on the above constitution shown in FIG. 3.

First, packet request and receiving part 23 performs a connecting operation with respect to server-side packet sending and processing part 13 via network 3, so as to designate a name of the contents of video data (that is, a name of a video program) which the client first requests. Next, packet request and receiving part 23 in the client 2 side requests server-side packet sending and processing part 13 to transfer data, from refreshed data which appears first in the requested data, in the unit of a packet (that is, one packet for each transmission operation). In the server 1 side, in response to the request, the relevant data are transferred from video data storage and processing part 11 to server-side packet sending and processing part 13, and the data are further transferred from the packet sending and processing part 13 to the client 2 side. The packet received by packet request and receiving part 23 are stored in a receiving buffer in packet request and receiving part 23, which decoding part 22 reads out and decodes in turn. On the other hand, in the client 2 side, at the same time as the receiving of a packet with respect to the first video data sent by server-side packet sending and processing part 13, measurements for each elapsed time relating to the transmission and the encoding are started by decoding-process delay detecting part 24 and transmission-process delay decoding part 25.

When a new packet is received, the transmission-process delay decoding part 25 measures an elapsed time (with respect to the new packet) from the arrival time of the first packet at the start of data transfer. The elapsed time measured in transmission-process delay detecting part 25 is compared with time index 71 relating to the data stream of the arrival packet, the index being registered in the packet. For example, an elapsed time from the arrival of the first packet to the arrival of the nth packet is compared with a time obtained by subtracting the time index of the first packet from the time index of the nth packet.

When the decoding with respect to the video data included in a packet which was received from packet request and receiving part 23 is completed, the decoding-process delay detecting part 24 measures an elapsed time from the time when the first packet (at the start of the data transfer) is read out from the receiving buffer in the packet request and receiving part 23. The elapsed time measured in decoding-process delay detecting part 24 is compared with time index 71 relating to the data stream of the packet read out from packet request and receiving part 23. For example, an elapsed time from the readout of the first packet to the readout of the nth packet is compared with a time obtained by subtracting the time index of the first packet from the time index of the nth packet.

Figure 4A:
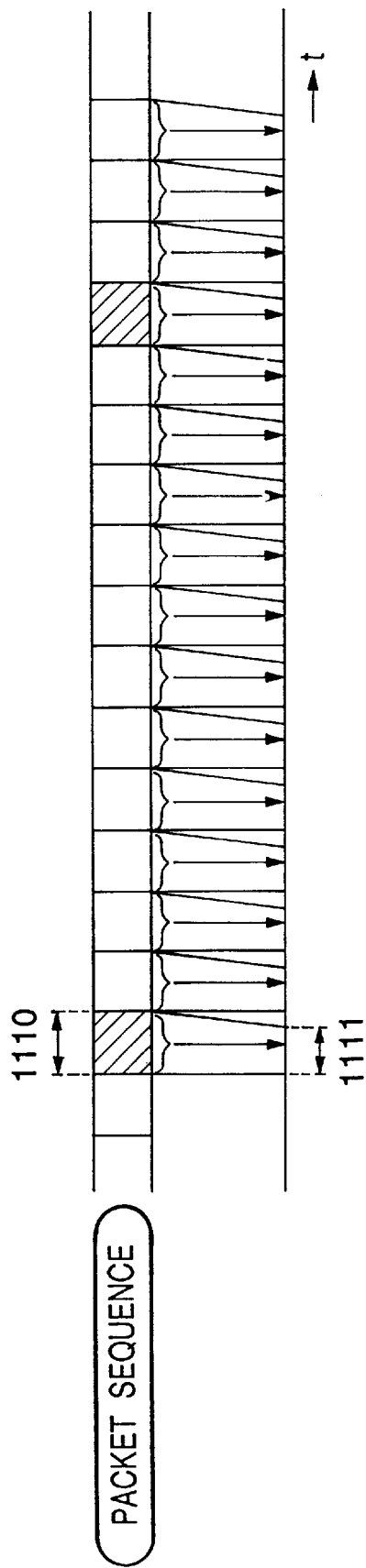
FIG. 4A is a diagram for explaining the concept for the transmission operation for a case in which the elapsed time relating to the transmission and decoding is smaller than an assigned processing time for a packet.
Figure 4B:
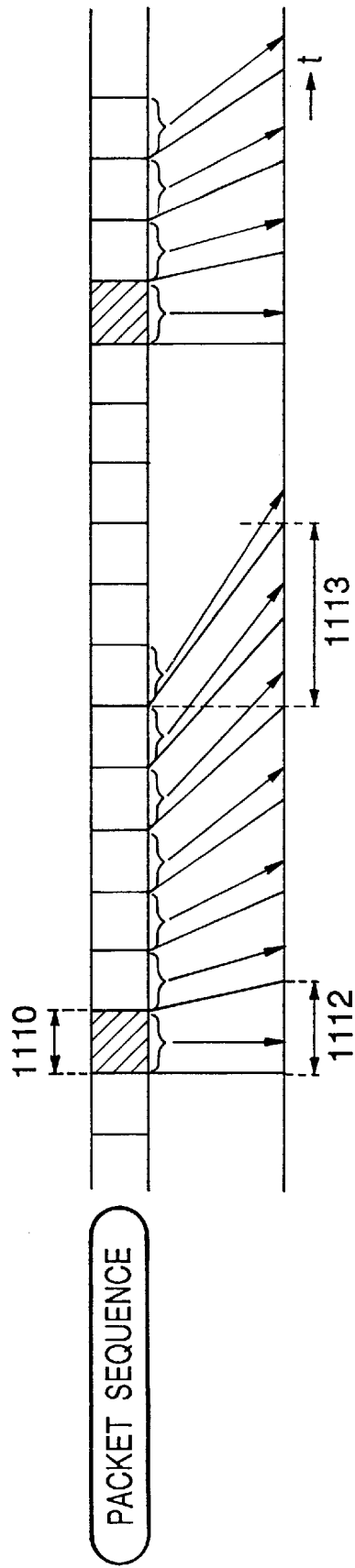
FIG. 4B is a diagram for explaining the concept for the transmission operation for a case in which the elapsed time relating to the transmission and decoding is greater than an assigned processing time for a packet.

Each delay detection performed in the decoding-process delay detecting part 24 and the transmission-process delay decoding part 25 is performed by a similar operation as follows. FIGS. 4A and 4B are diagrams for explaining the concept for the operation.

If the measured elapsed time is smaller than the relevant time difference relating to time index 71, the operations in decoding part 22 and packet request and receiving part 23 are suspended until the processing starting time indicated by the relevant time index. As shown in this case, transmission and decoding processing time 1111 per packet is smaller than processing time 1110 assigned to each packet.

As shown in FIG. 4B, if transmission and decoding processing time 1112 per packet is greater than the processing time 1110, and thus the elapsed time exceeds the relevant time difference relating to the time index, either of the following two operations will be performed according to the size of difference 1113.

Here, the processing elapsed time measured by decoding-process delay detecting part 24 is longer than the processing elapsed time measured by transmission-process delay decoding part 25, approximately by a time necessary for the decoding. Therefore, there is one case in which the processing elapsed time measured by transmission-process delay decoding part 25 has already exceeded the processing time 1110, while there is another case in which the processing elapsed time measured by transmission-process delay decoding part 25 does not exceeded the processing time 1110 but the processing elapsed time measured by encoding-process delay detecting part 24 exceeds the processing time 1110. When the processing elapsed time measured by transmission-process delay decoding part 25 has already exceeded the processing time 1110, a process for dealing with (i.e., canceling) delay may promptly be started without waiting for measurement results of encoding-process delay detecting part 24.

In the process for dealing with delay, an allowable value for the processing delay is decided at the client side. If difference 1113 is smaller than the allowable value, the operations in decoding part 22 and packet request and receiving part 23 are continued as they are.

If difference 1113 is larger than the allowable value, the operation in decoding part 22 is suspended, and the packets which have already arrived at packet request and receiving part 23 are canceled. Then, the client side requests refreshed data, which will appear first after a packet which is waiting for the next transmission, from server-side packet sending and processing part 13. At this request for refreshed data, a value of difference 1113, which was detected in the decoding-process delay detecting part 24 and the transmission-process delay decoding part 25, is also communicated to server 1. In the server 1 side which received the request (for refreshed data) from client 2, refreshed data detecting part 12 detects a packet including refreshed data which is expected to appear after a time corresponding to the communicated time difference elapses from the time indicated by time index 71 of a packet which was expected to be transmitted next. The server 1 then restarts data transmission from the detected packet.

When the client 2 side receives the refreshed data which meets the request, packet request and receiving part 23 continuously requests packets which are expected to follow the received packet. The decoding part 22 suspends the decoding operation until the starting time registered in the received packet, and then restarts the decoding operation, whereby the delay in processing is canceled.

Second Embodiment

Next, the second embodiment according to the present invention will be explained. This embodiment uses the same construction as shown in FIG. 3, and is effective when the transmission band of the network located between the server and the clients is very narrow in comparison with a transmission band necessary for video data transmission, or when a large size of transmission delay is expected because of passing through plural networks. FIGS. 5A–5C are diagrams for explaining the concept for transmission operations of this embodiment.

In this system, refreshed data are used for canceling delay. In the case of video data encoded by the H.261 coding method, the sizes of refreshed data themselves are relatively larger than that of other data. That is, as shown in FIG. 5B, refreshed data are large in comparison with the maximum size of packet 1104 transmitted on the network, and may spread over a length corresponding to plural packets (see the case indicated by reference numeral 1105). In order to cancel the delay, it is necessary to receive the whole of the refreshed data, and to decode and display them. Here, if plural packets are necessary for processing refreshed data, it is inefficient, as shown in FIG. 5A, for one packet data 1102 to be transmitted for one request packet 1101 which is transmitted from the client side to the server side. In particular, when the transmission band is insufficiently, or transmission delay is large, the processing delay included in transmission time 1103 with respect to a request packet cannot be neglected. Therefore, another method is adopted, in which the client obtains plural packets by one request.

When the client side first connects to the server so as so receive first refreshed data, data transmission in the unit of a packet is requested. Here, transmission-process delay decoding part 25 measures a time from the issue of a request to the arrival of the relevant packet, and confirms whether the transmission time per packet is larger than a processing time assigned for processing video data included in the packet. The transmission-process delay decoding part 25 also detects over how much packets the received refreshed data is spread.

If the transmission time per packet is sufficiently smaller than the processing time for a packet, it is concluded that a necessary transmission band is secured on the network. In this case, plural packets (per one transmission) are not requested, also in consideration of decentralization of the traffic. Accordingly, transmission in the unit of a packet is performed, as shown by transmission timing of each request packet, which is indicated by upward arrows in FIG. 5B; and by transmission timing of each packet data, which is indicated by downward arrows also in FIG. 5B. That is, in this case, operations are the same as those performed in the first embodiment.

On the other hand, in a situation in which the time necessary for transmitting a packet exceeds the processing time assigned for a packet, re-synchronization is necessary. Accordingly, when refreshed data is newly requested, a request for plural packets is issued at the time indicated by arrow 1108 in FIG. 5C, the number of the plural packets being decided based on the number of packets corresponding to the length of the refreshed data, which was detected after the request for the first refreshed data. In this case, the server continuously transmits the requested number of packets in response to one request, as shown by reference numeral 1109 in FIG. 5C. In the client side, the continuously-transmitted video data packets are stored in the receiving buffer. The video data packets stored in the receiving buffer is transferred to be decoded in order of time they have arrived.

If a necessary transmission band is not ensured, the allowable value (with respect to the processing delay) set in the first embodiment may not be enough for processing refreshed data. Therefore, when the processing for refreshed data is not completed even if delay exceeds the allowable value, re-synchronization is suspended. Accordingly, if refreshed data are processed within a time exceeding the allowable value, re-synchronization is performed after the processing of the refreshed data is completed. Other operations relating to this embodiment follow those performed in the first embodiment.

Third Embodiment

Figure 6:
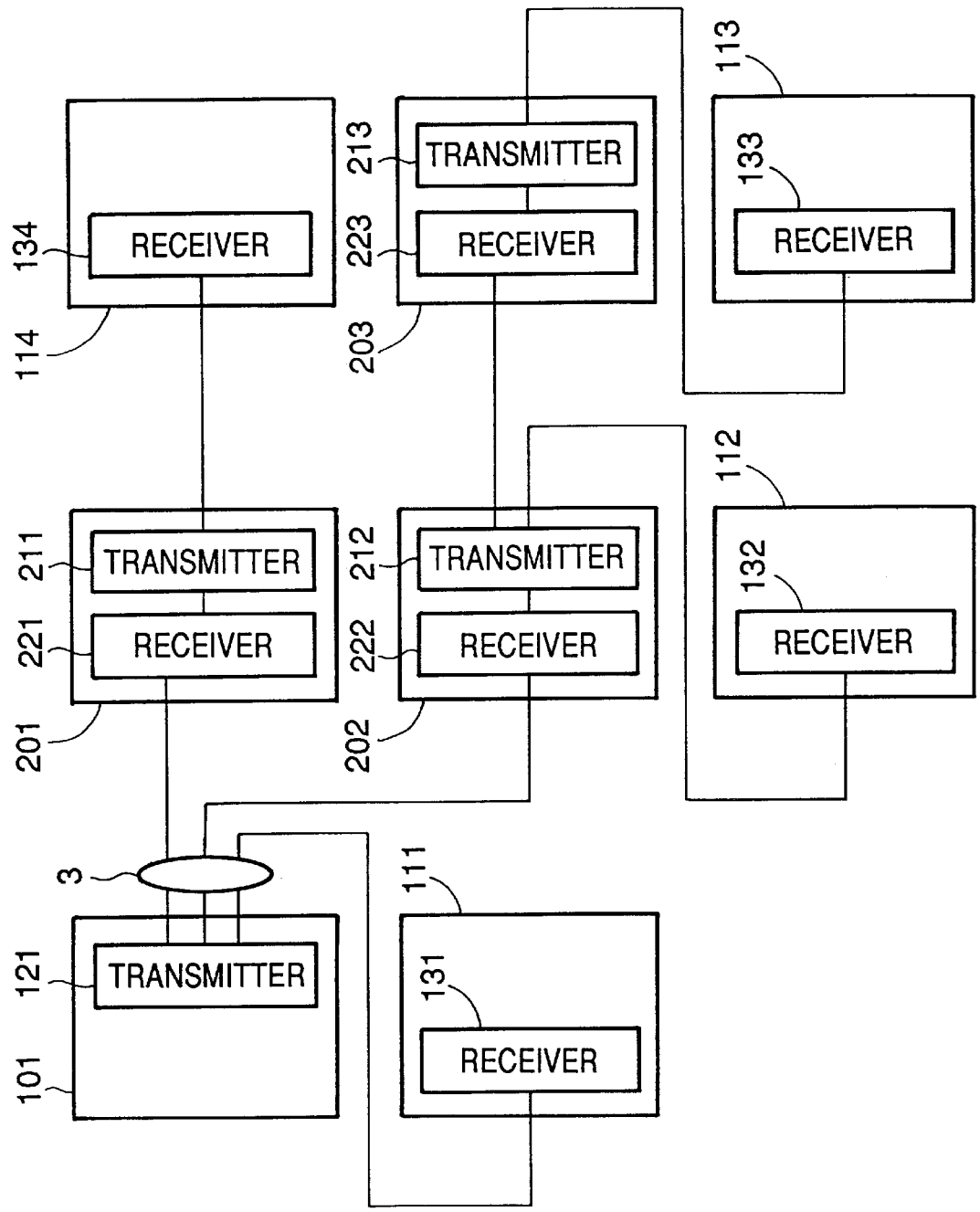
FIG. 6 is a diagram for explaining the system construction of the third embodiment according to the present invention.

FIG. 6 is a block diagram showing the construction of the third embodiment according to the present invention. In the figure, server 101 and clients 111–114 perform video data transmission and receipt as explained in the above-explained first or second embodiment, in which delay control is performed by the client side.

Figure 8:
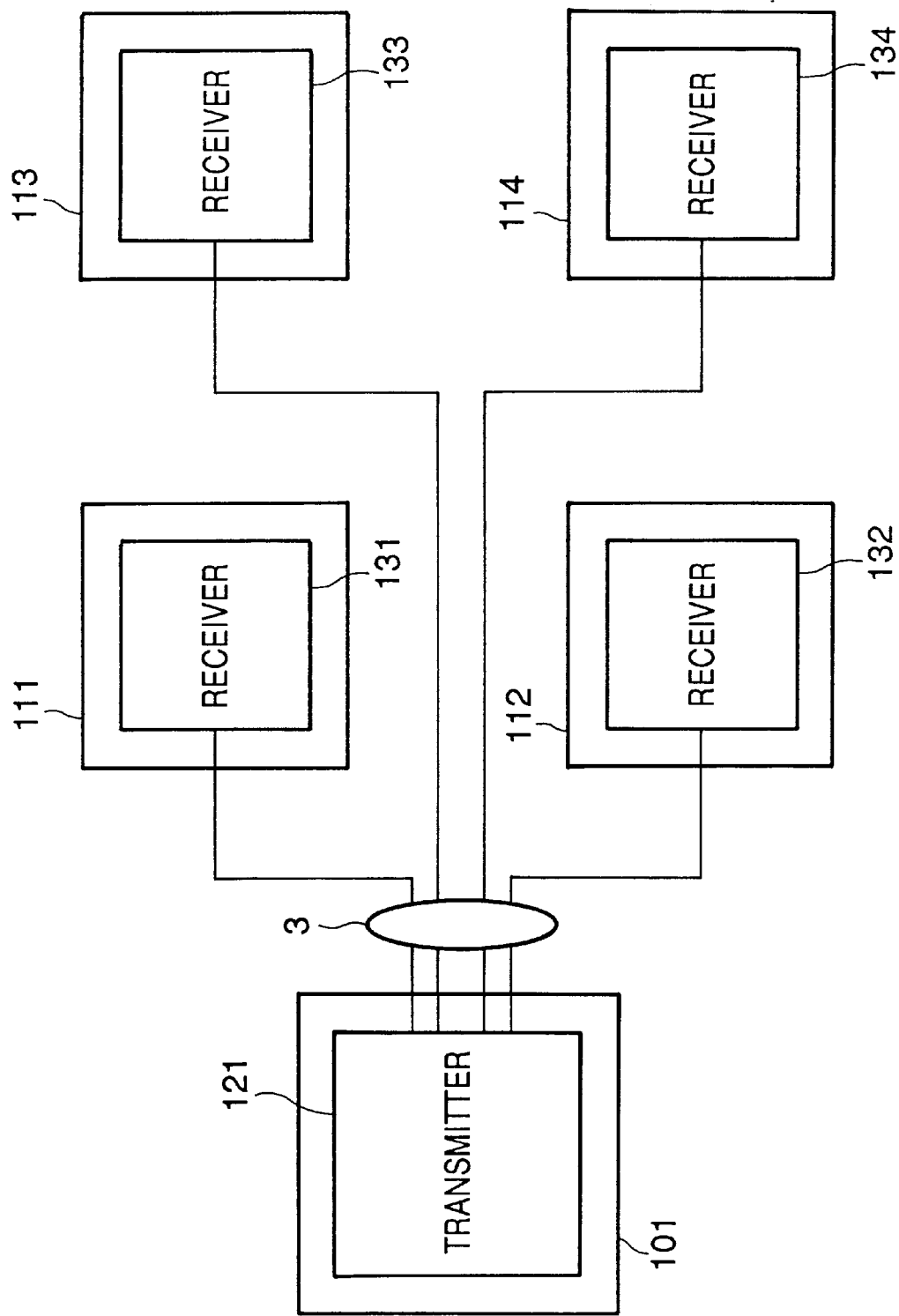
FIG. 8 shows an example of the conventional server-client data transmission system.

In the conventional example shown in FIG. 8, it is assumed that server 101 can transmit data to three clients at once, and thus data transmission to four clients or more leads to overload of the server. In this case, if four clients access server 101 at once, the load borne by the server exceeds the allowable amount (corresponding to "three clients"). In this case, server 101 cannot normally transmit data, that is, necessary data may not be sent to a client, or data transmission may be delayed.

In consideration of such a situation, in the present embodiment, as shown in FIG. 6, relay servers 201 and 202, as well as client 111, are connected to master server 101; relay server 203, as well as client 112, is connected to relay server 202; and clients 113 and 114 are respectively connected to relay servers 203 and 201.

The master server 101 transmits encoded video data to relay servers 201, 202 and client 111 by using transmitter 121.

The relay servers 201 and 202 receives the data transmitted from master server 101 by using receivers 221 and 222, respectively, which are provided in each relay server. The relay servers 201 and 202 then transmits the received data to another relay server 203, and client 114 and 112 by using transmitters 211 and 212, respectively. That is, each relay server has a function for relaying data transmitted. Here, multi-stage connection of relay servers is possible, as shown in the case of relay servers 202 and 203.

Clients 111, 112, 113, and 114 receive data, which were transmitted from master server 101, and relay servers 202, 203, and 201, by using receivers 131, 132, 133, and 134, respectively.

At this time, the load borne by master server 101 corresponds to three apparatus, that is, client 111 and relay servers 201 and 202; thus, the load does not exceed the allowable amount for normal data supply. In addition, if an allowable amount with respect to each relay server is two apparatus or more, data can be normally provided for all located relay servers and clients.

As explained above, by connecting the master server and the clients via one or multi-stage relay servers, it is possible to increase effective transmitters; to distribute the transmission function; and to increase the number of clients which can use the registered data at once.

Fourth Embodiment

Figure 7:
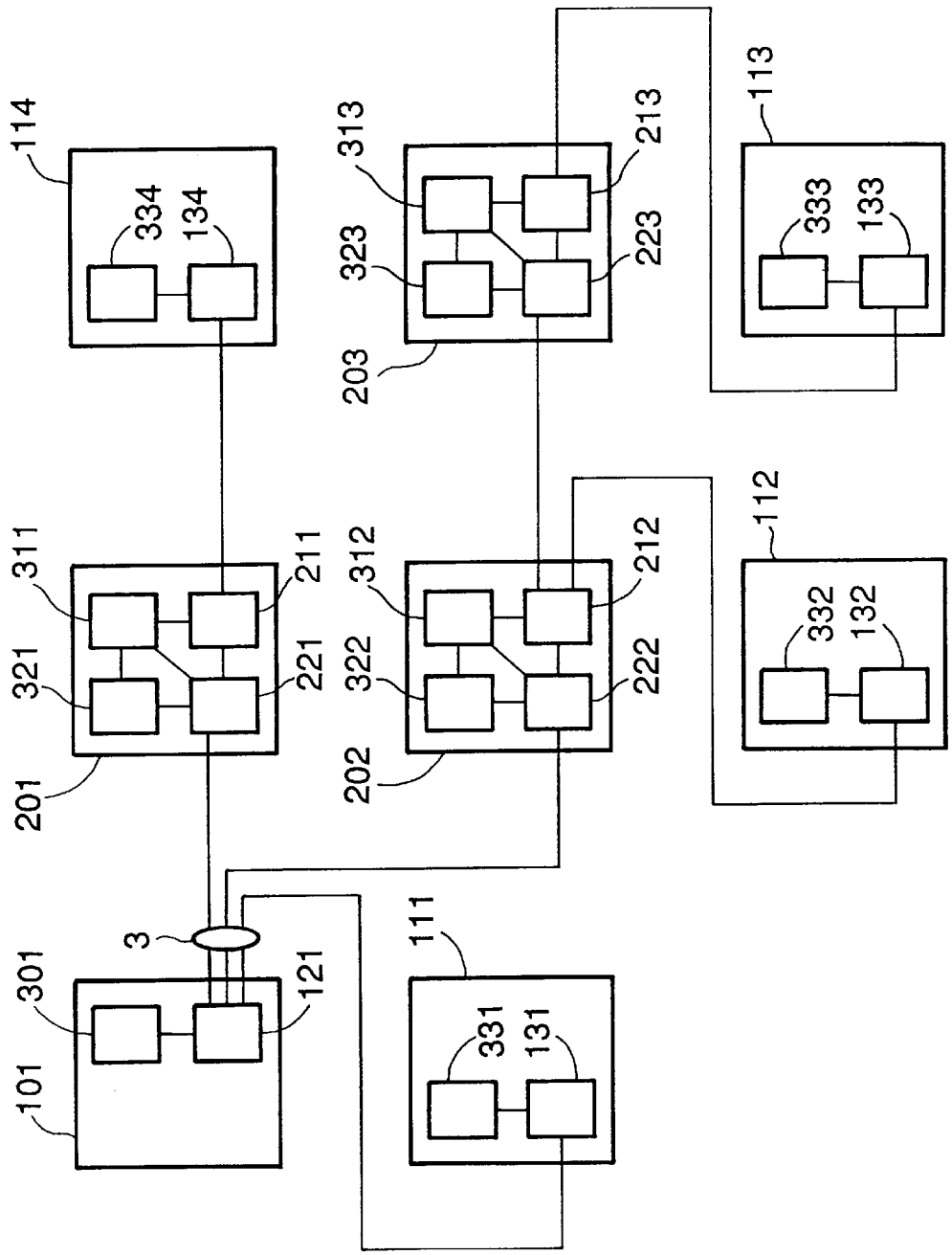
FIG. 7 is a diagram for explaining the system construction of the fourth embodiment according to the present invention.

FIG. 7 is a block diagram showing the construction of the fourth embodiment according to the present invention. In this construction, load monitors 301, 311, 312, and 313 are provided in master server, and relay servers 201, 202, and 203, respectively. Additionally, path-reconstruction units 321, 322, 323, 331, 332, 333, and 334 are provided in relay servers 201, 202, 203, and clients 111, 112, 113, and 114, respectively.

The load monitors 301, 311, 312, and 313 in the servers measure load statuses of each server regularly or irregularly, and stores the measured results. Each detected load status is sent to a server to which the server relating to the load status is connected. The server which received the load status further sends the received load status and a load status of itself to a server to which this server (which received the load status) is connected. Such an operation is repeated until the load statuses are communicated to the master server 101. In an example case regarding master server 101, and relay servers 202 and 203, a load status with respect to relay server 203 is communicated to relay server 202, and then load statuses with respect to relay servers 202 and 203 are communicated to master server 101. The load statuses as collected above are then sent from master server 101 to path-reconstruction units 321–323, and 331–334, via paths similar to those used in data transmission.

The path-reconstruction units 321–323, and 331–334 in the relay servers and the clients detect a server having a lesser load among the servers whose loads were examined. If there exists another server whose load is less than that of a server to which the relevant client or relay server is presently connected, the path-reconstruction unit of the relevant server disconnects the path with respect to the presently-connected server, and newly makes connection with a server with a lesser load.

Instead of changing the connection form with respect to a client or a relay server which itself includes a path-reconstruction unit, the path-reconstruction unit may change the connection form with respect to another client or relay server which does not have a path-reconstruction unit in itself. That is, the load monitor in a server sends a measured load status to another server to which the relevant server is connected. The server in the receiving side then sends the received load status and a load status measured in itself to another server to which said server in the receiving side is connected. This operation is repeated until the load statuses are communicated to the master server. In these operations, each path-reconstruction unit can detect load statuses relating to a relay server which the relevant server is connected to; or relay servers which are located in lower reaches in the connection paths. Each path-reconstruction unit finds a server with overload with reference to the load statuses as detected above. If a server with overload is found, the path-reconstruction unit selects a set of relay servers or clients sufficient to overcome the overload status among relay servers and clients which are connected to the overload server, and changes the connection paths so that the selected set is connected to a server with a lesser load.

In addition, as a variation different from the above construction in which each of the master and relay servers has a load monitor in one-to-one form, it is also possible to realize a construction in which a load monitor monitoring load statuses of plural servers is provided.

Similarly, it is also possible to provide only one path-reconstruction unit in the video distribution system so as to perform every change relating to the whole of the paths by this path-reconstruction unit. If the video distribution system is realized by using such a single path-reconstruction unit, the path-reconstruction unit collects load statuses relating to all the master and relay servers from the relevant load monitors, and detects a server with overload. If there is a server with overload, the path-reconstruction unit selects a set of relay servers or clients sufficient to overcome the overload status among relay servers and clients which are connected to the overload server, and changes the connection paths so that the selected set is connected to a server with a lesser load.

As described above, by detecting a server with overload by using the load monitors and the path-reconstruction units, and by performing the path change to a server with a lesser load, loads of the master and relay servers are always kept low and the average load is thus low. Accordingly, the quality relating to the overall service is made uniform.

Fifth Embodiment

This embodiment is used for changing video data used in the system of the above third or fourth embodiment.

The relay servers 201, 202, and 203 only relay data transmitted from master server 101, that is, they never provide data of their own. When data used in the system are changed, only master server 101, which has a function of providing data, has to perform a process for changing data, while relay servers 201–203 are not affected by such a data-change process.

In this way, data provision is realized only by a master server, and data transmission function for the clients is distributed by using relay servers which have a function of data relay. Therefore, only the one master server needs data change; thus, operations after the data change are easily performed.

Sixth Embodiment

This embodiment is applied to a case for providing data for a client which does not have permission to access the master server.

In a conventional example as shown in FIG. 8, there may be a case in which the access for master server 101 is limited so as to ensure the system security; and client 112 has no permission to access master server 101. In such a case, client 112 cannot access master server 101, and thus cannot directly receive data from master server 101.

In the present embodiment, for example, relay server 202, which is permitted to access master server 101 and is also permitted to access client 112, is used. In this case, a connection between master server 101 and relay server 202, and a connection between relay server 202 and client 112 are simultaneously established (refer to the system construction in FIG. 7). In this way, the relay function such that relay server 202 receives data transmitted from master server 101, and transmits the received data to client 112 can be realized. According to this function, data transmission between the master server and the client, which could never be realized due to the access permission, can be realized.

Therefore, by using a relay server which is permitted to access a server, it is possible to provide data to another server or client which cannot directly access the master server.

Additionally, in the embodiments explained above, data to be transmitted are video data. However, the present invention is not limited to a video data distribution system, and can be applied to a system treating data consisting of (i) data which can be decoded by using a correlation with other data; and (ii) data which can be independently decoded and which are periodically included in the whole of the data.

What is claimed is:

1. A network data distribution system for distributing encoded data from a server side to clients via a network, comprising:

in the server side,
packet data forming means for dividing data requested from a client into packets, and forming packet data by adding a time index relating to a process used for processing each divided packet to the packet;
sending means for sending the packet data to the client which requested the data; and
in the client side,
request means for requesting desired data from the server;
receiving means for receiving the packet data sent from the server;
transmission delay calculating means for calculating an amount of transmission delay based on the time index included in the packet data received by the receiving means;
process delay calculating means for calculating an amount of process delay relating to decoding of the received packet data, based on the time index included in the packet data received by the receiving means;
delay information communicating means for communicating delay time information based on the calculated amount of transmission or process delay to the server, and
wherein the sending means in the server side selects the packet data to be next transmitted based on the delay time information communicated by the delay information communicating means, and sends the selected packet data.

2. A network data distribution system as claimed in claim 1, wherein the encoded data have a form such that data which can be independently decoded are periodically included in data which can be decoded by using a correlation with other data.

3. A network data distribution system as claimed in claim 2, wherein the encoded data are video data which were processed by using a compressive coding method.

4. A network data distribution system as claimed in claim 1, wherein the delay information communicating means communicates the delay time information to the server when the calculated amount of transmission or process delay exceeds a predetermined allowable value.

5. A network data distribution system as claimed in claim 2, wherein the packet data forming means in the server side forms the packet data which includes an identifier indicating whether the data which can be independently decoded is included in the packet data, as well as the time index.

6. A network data distribution system as claimed in claim 2, wherein the delay information communicating means in the client side sends refreshed-data request information for requesting the data which can be independently decoded, as well as the delay time information, and when the server side receives the refreshed-data request information, the sending means selects and sends the packet data to be transmitted next which includes such data which can be independently decoded, based on the delay time information.

7. A network data distribution system as claimed in claim 1, wherein the request means in the client side requests the server to send a plurality of the packet data together, and the sending means in the server side sends the plural packet data continuously to the client side when transmission of a group of the plural packet data is requested by the request means.

8. A network data distribution system as claimed in claim 7, wherein the encoded data have a form such that data which can be independently decoded are periodically included in data which can be decoded by using a correlation with other data, and the system further comprises, in the client side, means for calculating the number of the packet data corresponding to the length of the data which can be independently decoded in the received packet data, and for setting the number of the plural packet data, which the request means requests from the server, based on a calculated result.

9. A network data distribution system as claimed in claim 1, further comprising, in the client side:

decoding control means for controlling a decoding process in a manner such that the decoding process for the packet data which were received and have not yet been decoded is suspended when the sending means in the server side selectively sends the packet data based on the delay time information, and the decoding process is restarted with the packet data which the sending means newly selects and sends.

10. A network data distribution system as claimed in claim 1, wherein single or multi-stage relay servers, each relay server having a receiver for receiving data and a transmitter for transmitting the received data, are located in a part of or the whole of plural paths concatenating the server and the clients via the network.

11. A network data distribution system as claimed in claim 10, wherein the transmitter transmits data to plural destinations in parallel.

12. A network data distribution system as claimed in claim 10, further comprising:

server load monitoring means for monitoring a load status of the server which distributes data; and path-reconstructing means for changing the form of the path-connection between the server which distributes data, said relay servers, and the clients, based on the load status monitored by the server load monitoring means.

13. A network data distribution system as claimed in claim 10, further comprising:

relay-server load monitoring means for monitoring a load status of each relay server; and path-reconstructing means for changing the form of the path-connection between the server which distributes data, said relay servers, and the clients, based on the load status monitored by the relay-server load monitoring means.

14. A network data distribution system as claimed in claim 10, wherein said single or multi-stage relay servers include a relay server which has permission to access both the server which distributes data and a client which has no permission to access said server which distributes data.

15. A data distribution server used in a network data distribution system for distributing encoded data from a server side to clients via a network, the server comprising:

packet data forming means for dividing data requested from a client into packets, and forming packet data by adding a time index relating to a process used for processing each divided packet to the packet; and sending means for sending the packet data to the client which requested the data, and for selecting the packet data to be next transmitted based on delay time information communicated by the client, the information relating to transmission or a decoding process with respect to the packet data; and sending the selected packet data.

16. A data distribution server as claimed in claim 15, wherein the encoded data have a form such that data which can be independently decoded are periodically included in data which can be decoded by using a correlation with other data.

17. A data distribution server as claimed in claim 16, wherein the encoded data are video data which were processed by using a compressive coding method.

18. A data distribution server as claimed in claim 16, wherein the packet data forming means forms the packet data which includes an identifier indicating whether the data which can be independently decoded is included in the packet data, as well as the time index.

19. A data distribution server as claimed in claim 16, wherein when the data which can be independently decoded is requested by a client, the sending means selects and sends the packet data to be transmitted next which includes such data which can be independently decoded, based on the delay time information.

20. A data distribution server as claimed in claim 15, wherein when transmission of a group of plural packet data is requested by a client, the sending means sends the plural packet data continuously to the client side.

21. A client apparatus used in a network data distribution system for distributing encoded data from a server side to clients via a network, the apparatus comprising:

request means for requesting desired data from the server;

receiving means for receiving the packet data sent from the server;

transmission delay calculating means for calculating an amount of transmission delay based on a time index included in the packet data received by the receiving means, the time index relating to a process used for processing the packet data;

process delay calculating means for calculating an amount of process delay relating to decoding of the received packet data, based on the time index included in the packet data received by the receiving means; and delay information communicating means for communicating delay time information based on the calculated amount of transmission or process delay to the server.

22. A client apparatus as claimed in claim 21, wherein the encoded data have a form such that data which can be independently decoded are periodically included in data which can be decoded by using a correlation with other data.

23. A client apparatus as claimed in claim 22, wherein the encoded data are video data which were processed by using a compressive coding method.

24. A client apparatus as claimed in claim 21, wherein the delay information communicating means communicates the delay time information to the server when the calculated amount of transmission or process delay exceeds a predetermined allowable value.

25. A client apparatus as claimed in claim 22, wherein the delay information communicating means sends refreshed-data request information for requesting the data which can be independently decoded, as well as the delay time information.

26. A client apparatus as claimed in claim 21, wherein the request means in the client side requests the server to send a plurality of the packet data together.

27. A client apparatus as claimed in claim 26, wherein the encoded data have a form such that data which can be independently decoded are periodically included in data which can be decoded by using a correlation with other data, and the apparatus further comprises means for calculating the number of the packet data corresponding to the length of the data which can be independently decoded in the received packet data, and for setting the number of the plural packet data, which the request means requests from the server, based on a calculated result.

28. A client apparatus as claimed in claim 21, further comprising:

decoding control means for controlling a decoding process in a manner such that the decoding process for the packet data which were received and have not yet been decoded is suspended in accordance with the kind and transmission timing with respect to the packet data sent from the server side, and the decoding process is restarted with another packet data which is newly received.

29. A data distribution method used in a network data distribution system for distributing encoded data from a server side to clients via a network, the method comprising the steps of:

dividing data requested from a client into packets, and forming packet data by adding a time index relating to a process used for processing each divided packet to the packet; and sending the packet data to the client which requested the data, selecting the packet data to be next transmitted based on delay time information communicated by the client, the information relating to transmission or a decoding process with respect to the packet data, and sending the selected packet data.

30. A data distribution method as claimed in claim 29, wherein the encoded data have a form such that data which can be independently decoded are periodically included in data which can be decoded by using a correlation with other data.

31. A data distribution method as claimed in claim 30, wherein the encoded data are video data which were processed by using a compressive coding method.

32. A data distribution method as claimed in claim 30, wherein in the step of forming the packet data, the packet data which includes an identifier indicating whether the data which can be independently decoded is included in the packet data, as well as the time index, is formed.

33. A data distribution method as claimed in claim 30, wherein in the step of selecting and sending the packet data, when the data which can be independently decoded is requested by a client, the packet data to be transmitted next which includes such data which can be independently decoded is selected and sent based on the delay time information.

34. A data distribution method as claimed in claim 29, wherein in the step of selecting and sending the packet data, when transmission of a group of plural packet data is requested by a client, the plural packet data are continuously sent to the client side.

35. A storage medium storing a computer program for making a computer execute one of the methods claimed in claims 29–34.

36. A client-side control method used in a network data distribution system for distributing encoded data from a server side to clients via a network, the method comprising the steps of:

requesting desired data from the server;

receiving the packet data sent from the server;

calculating an amount of transmission delay based on a time index included in the received packet data, the time index relating to a process used for processing the packet data;

calculating an amount of process delay relating to decoding of the received packet data, based on the time index included in the received packet data; and communicating delay time information based on the calculated amount of transmission or process delay to the server.

37. A client-side control method as claimed in claim 36, wherein the encoded data have a form such that data which can be independently decoded are periodically included in data which can be decoded by using a correlation with other data.

38. A client-side control method as claimed in claim 37, wherein the encoded data are video data which were processed by using a compressive coding method.

39. A client-side control method as claimed in claim 36, wherein in the step of communicating the delay time information, the delay time information is communicated to the server when the calculated amount of transmission or process delay exceeds a predetermined allowable value.

40. A client-side control method as claimed in claim 37, wherein in the step of communicating the delay time information, refreshed-data request information for requesting the data which can be independently decoded is sent as well as the delay time information.

41. A client-side control method as claimed in claim 36, wherein the step of requesting data comprises requesting the server to send a plurality of the packet data together.

42. A client-side control method as claimed in claim 41, wherein the encoded data have a form such that data which can be independently decoded are periodically included in data which can be decoded by using a correlation with other data, and the method further comprises the step of calculating the number of the packet data corresponding to the length of the data which can be independently decoded in the received packet data, and setting the number of the plural packet data, which are requested from the server, based on a calculated result.

43. A client-side control method as claimed in claim 36, further comprising the step of:

controlling a decoding process in a manner such that the decoding process for the packet data which were received and have not yet been decoded is suspended in accordance with the kind and transmission timing with respect to the packet data sent from the server side, and the decoding process is restarted with another packet data which is newly received.

44. A storage medium storing a computer program for making a computer execute one of the methods claimed in claims 36–43.

45. A network data distribution system as claimed in claim 1, wherein the time index indicates an expected starting time of the decoding process.

46. A network data distribution system as claimed in claim 1, wherein the calculated amount of transmission delay is a difference between an elapsed time from the arrival of a first target packet data to the arrival of a second target packet data, and a time obtained by subtracting the time index of the first target packet data from the time index of the second target packet data.

47. A network data distribution system as claimed in claim 1, wherein the calculated amount of process delay is a difference between an elapsed time from the starting time of processing of a first target packet data to the starting time of processing of a second target packet data, and a time obtained by subtracting the time index of the first target packet data from the time index of the second target packet data.

48. A data distribution server as claimed in claim 15, wherein the time index indicates an expected starting time of the decoding process.

49. A client apparatus as claimed in claim 21, wherein the calculated amount of transmission delay is a difference between an elapsed time from the arrival of a first target packet data to the arrival of a second target packet data, and a time obtained by subtracting the time index of the first target packet data from the time index of the second target packet data.

50. A client apparatus as claimed in claim 21, wherein the calculated amount of process delay is a difference between an elapsed time from the starting time of processing of a first target packet data to the starting time of processing of a second target packet data, and a time obtained by subtracting the time index of the first target packet data from the time index of the second target packet data.

51. A data distribution method as claimed in claim 29, wherein the time index indicates an expected starting time of the decoding process.

52. A client-side control method as claimed in claim 36, wherein the calculated amount of transmission delay is a difference between an elapsed time from the arrival of a first target packet data to the arrival of a second target packet data, and a time obtained by subtracting the time index of the first target packet data from the time index of the second target packet data.

53. A client-side control method as claimed in claim 36, wherein the calculated amount of process delay is a difference between an elapsed time from the starting time of processing of a first target packet data to the starting time of processing of a second target packet data, and a time obtained by subtracting the time index of the first target packet data from the time index of the second target packet data.

* * * * *